United States Patent
Van Soest et al.

(10) Patent No.: US 6,755,915 B1
(45) Date of Patent: Jun. 29, 2004

(54) METHOD FOR THE PREPARATION OF STARCH PARTICLES

(75) Inventors: Jeroen Johannes Gerardus Van Soest, Wageningen (NL); Frank Hubertus Maria Stappers, Grubbenvorst (NL); Renée Josie Gide Van Schijndel, Wageningen (NL); Kornelis Fester Gottlieb, Assen (NL); Herman Feil, Ede (NL)

(73) Assignee: Ecosynthetix Inc., Lansing, MI (US)

( * ) Notice: Subject to any disclaimer, the term of this patent is extended or adjusted under 35 U.S.C. 154(b) by 0 days.

(21) Appl. No.: 09/869,706

(22) PCT Filed: Dec. 29, 1999

(86) PCT No.: PCT/NL99/00814

§ 371 (c)(1),
(2), (4) Date: Oct. 1, 2001

(87) PCT Pub. No.: WO00/40617

PCT Pub. Date: Jul. 13, 2000

(30) Foreign Application Priority Data

Dec. 30, 1998 (NL) .............................................. 1010926

(51) Int. Cl.[7] ......................... C08B 30/00; C08B 31/00; C08B 33/00; C08B 35/00; C07G 17/00
(52) U.S. Cl. ............................. 127/65; 127/67; 127/69; 127/70; 127/71; 536/102; 536/106; 536/124
(58) Field of Search ............................. 127/65, 67, 69, 127/70, 71; 536/102, 106, 124

(56) References Cited

U.S. PATENT DOCUMENTS

| | | | | |
|---|---|---|---|---|
| 4,716,186 A | * | 12/1987 | Portnoy et al. ................ | 524/50 |
| 4,803,264 A | * | 2/1989 | Krijnen et al. ............... | 536/114 |
| 5,409,726 A | * | 4/1995 | Stanley et al. .............. | 426/573 |
| 5,470,968 A | * | 11/1995 | Katcher et al. ............. | 536/102 |
| 6,197,757 B1 | * | 3/2001 | Perrier et al. ................. | 514/53 |
| 6,413,505 B1 | * | 7/2002 | Vitale et al. ............. | 424/70.11 |

FOREIGN PATENT DOCUMENTS

| | | |
|---|---|---|
| DE | 14 43 359 | 11/1968 |
| EP | 0 900 807 | 3/1999 |
| JP | 58 171404 | 10/1983 |
| NL | 7 402 700 | 9/1974 |
| WO | WO 99/01214 | 1/1999 |

* cited by examiner

Primary Examiner—Mark L. Bell
Assistant Examiner—Patricia L. Hailey
(74) Attorney, Agent, or Firm—Young & Thompson

(57) ABSTRACT

A method for the preparation of starch particles in a two-phase system comprises at least the following steps: a) a preparation of a first phase comprising a dispersion of starch in water; b) preparation of a dispersion or emulsion of the first phase in a second liquid phase, with the proviso that the second phase is not water; c) cross-linking of the starch present in the first phase; d) separating the starch particles thus formed. According to a first aspect of the invention the second phase consists of a hydrophobic liquid and step b) consists in forming an oil-in-water emulsion, which is then inverted to a water-in-oil emulsion. According to a second aspect of the invention, the second phase consists of a water-miscible non-solvent for starch. Starch particles of very small particles size can be produced in a controlled manner by means of this method.

15 Claims, No Drawings

METHOD FOR THE PREPARATION OF STARCH PARTICLES

The present invention relates to a method for the preparation of starch particles by means of which small starch particles having a particle size of 50 nm to a few mm can be obtained in a simple manner. In particular small starch particles having a particle size of 50 nm to 100 µm, so-called nano- or micro-particles, are highly desirable for a broad range of applications. Small starch particles can be used in pharmacy, cosmetics, foods, paints, coatings, paper, inks and many other applications.

Up to now small particles of this type have been prepared using polymers as starting materials by means of (multiple) emulsion cross-linking or solvent evaporation, spray-drying and other methods (Jiugao, Y. et al., Starch 46 (1994) 252; Arshady, R., Pol. Eng. Sci., 29 (1989), 1747). A number of routes are described in the following patents: PCT/GB/01735, PCT/GB95/00686, PCT/GB92/01692, PCT/GB93/01421, EP 0 213 303 B1. In EP 0 213 303 B1 two immiscible aqueous liquid phases are used as the starting material. In the case of emulsion cross-linking a great deal of mechanical energy is required and it is very difficult to separate off and to purify the particles, which leads to high production costs (for example in PCT/GB93/01692). Evaporation and spray-drying are also expensive techniques which demand the use of large quantities of (usually organic, volatile) solvents. A polymer or starch dissolved in water is always used as the starting material. In PCT/GB95/00686 a combination of a water-soluble and water-insoluble polymer is used as the starting material. However, both are dissolved in two different solvents.

The present invention now provides a method for the preparation of starch particles using a two-phase system with starch as a third main component. The method comprises at least the following steps:
 a) preparation of a first phase comprising a dispersion of starch in water;
 b) preparation of a dispersion or emulsion of the first phase in a second liquid phase, with the proviso that the second phase is not water;
 c) cross-linking of the starch present in the first phase;
 d) separating the starch particles thus formed.

According to the present invention starch is understood to be native starch, granular starch, fractions and derivatives of starch and agricultural raw materials which are rich in starch, (containing at least 80% starch wt./wt.), such as wheat flour. The starch can originate from a wide variety of natural sources, such as wheat, corn, amylocorn, wax corn, potatoes, quinoa, rice, etc.

Preferably, the starch is granular starch which can be native or modified, for example physically, chemically or enzymatically modified. The starch does not have to be soluble in water cold. Optionally the starch can also be fully or partially gelatinised or melted. A mixture of various types of starch can also be used. For instance, partially soluble, (pre-)gelatinised or modified starch can be added to native starch.

Partially or completely fractionated starch, such as starch enriched in amylose or, on the contrary, enriched in amylopectin, can also be used. Derivatives which can be used are partially or completely hydrolysed starch, such as maltodextrins, in which context hydrolysis can be under the influence of heat or acid, basic or enzymatic hydrolysis, oxidised starch (carboxy, dialdehyde, etc.), carboxylated, chlorinated or sulphated starch, starch that has been rendered hydrophobic (esters, such as acetate, succinate, half-esters, phosphate esters) and phosphated starch, starch ethers (hydroxyalkyl), and the like. Furthermore, starches with combinations of the abovementioned modifications, i.e. bifunctional or multifunctional starch, can also be used. The derivatives can also be granular.

Other carbohydrates or polymers can be used as auxiliaries. These auxiliaries make up at most 15%, preferably 1–10% (wt./wt. based on starch solids). Said auxiliaries include, in particular, other carbohydrates such as alginates, pectins and carboxymethylcellulose.

According to a first aspect of the present invention, the second phase is a hydrophobic phase. Said second phase is dispersed or emulsified in the first phase (starch-in-water) in such a way that an oil-in-water (O/W) emulsion is produced (step b) i)). Said O/W emulsion is then inverted to a water-in-oil (W/O) emulsion (step b) ii)). This process is referred to as "phase inversion" in this application. In the W/O emulsion the aqueous phase consists of the first water-in-starch phase. The starch can be granular, partially gelatinised or dissolved here. Following the phase inversion step, the starch particles are cross-linked and then separated.

The cross-linking reaction can already have been started before or during phase inversion. This method can be used in particular if the conditions for the cross-linking reaction are such that the cross-linking reaction proceeds slowly. Complete cross-linking in general takes place after phase inversion.

The starch does not yet have to be completely gelatinised at the start of the method. According to a preferred embodiment of the invention, partial or complete further gelatinising of the granular starch is effected during, before or after phase inversion. The starch can remain partially granular during cross-linking. Gelatinising can be effected by means of raising the temperature or by adding salts, such as hydroxides, or by a combination thereof.

It is advantageous if in step b) the ratio of hydrophobic phase:water in the O/W emulsion is of the order of magnitude of 80:20 to 20:80. Preferably, the ratio of hydrophobic phase:water in the O/W emulsion is between 60:40 and 40:60 (V/V).

All liquids which are not miscible with water are suitable as hydrophobic phase. Examples of these are hydrocarbons (alkanes, cycloalkanes), ethers, esters, halogenohydrocarbons, di- and triglycerides, fats, waxes and oils. Examples of oils or fats are palm oil, kernel oil, sunflower oil and salad oil. A number of apolar liquids are octane, dodecane, toluene, decalin, xylene, higher alcohols such as pentanol and octanol, or a mixture thereof. Paraffin oil, hexane or cyclohexane are preferably used. Preferably the viscosity of the hydrophobic phase is close to the viscosity of the starch/water phase. The miscibility of the water/starch phase with the hydrophobic phase preferably has to be as low as possible.

Preferably the O/W emulsion is stabilised with the aid of a surfactant. Phase inversion, i.e. the inversion from O/W emulsion to a W/O emulsion (step b) ii)), can take place in various ways. 1) If a surfactant is used which is temperature-sensitive, the phase inversion can be induced by raising the temperature. 2) The O/W emulsion can be destabilised by adding another surfactant. This surfactant stabilises a W/O emulsion. 3)

Phase inversion can be obtained by adding a hydrophobic liquid. 4) Phase inversion can also be obtained with the aid of the addition of salts.

Phase inversion by means of raising the temperature may be mentioned first. Raising the temperature gives rise to a shift of the surfactant molecules at the O/W interface towards the oil phase. The result of this is that the protection which the polar head provides against coalescence of the hydrophobic phase also decreases. At a certain temperature, which is dependent on, for example, the hydrophobic phase, type of surfactant and type and concentration of starch in the aqueous phase, the protection has decreased to such an extent that all oil droplets coalesce and the emulsion changes over or inverts from O/W to W/O.

The phase inversion temperature (PIT) is dependent on the chosen (water/starch)/oil (hydrophobic phase)/surfactant system. The surfactant concerned must preferably have an equal affinity for water and the hydrophobic phase, for example an oil. This is expressed in the HLB (hydrophilic-lipophilic balance) value. Preferably surfactants are used which have a HLB value of 8 to 20 or more preferentially of 10 to 15. The higher the HLB value the greater is the affinity of the surfactant for the aqueous phase. If this value becomes too high a much greater rise in temperature (or the addition of surfactant or hydrophobic liquid or salt) is needed in order to make phase inversion possible, or there is even no longer any phase inversion at all.

In principle, a wide variety of surfactants or emulsifiers can be used, such as fatty acid monoglycerides, such as Dimodan, Acidan (distilled monoglyceride) and glycerol monostearate, citric, lactic and acetic acid esters of fatty acids (Cetodan, Lactodan, Panodan, Promodan), propylene glycol esters of fatty acids (Triodan), sorbitan monolaurate, sorbitan monopalmitate, calcium stearate, ethoxylated and succinylated monoglycerides, glucose and sucrose esters; also fatty acid alcohols (cetanol, palmitol, stearyl alcohol), free fatty acids, lipids, phospholipids, lecithins, glycolipids and glycols. Examples of very suitable surfactants are those having a polar polyoxyethylene head. Such surfactants are, in particular, marketed under the trade name Tween. Tween-85 (polyoxyethylene (20) sorbitan trioleate, HLB=11±1) is preferably used.

As stated above: the temperature at which phase inversion takes place is dependent on various factors, such as the type and to a lesser extent the concentration of the surfactant. The PIT can, for example, be lowered by:
increasing the salt concentration in the emulsion;
reducing the water:oil ratio;
adding an alcohol;
raising or lowering the pH, depending on the type of surfactant.

Preferably the water/oil (hydrophobic phase)/surfactant system is so chosen that a temperature rise of only 20° C., preferably only 10° C., is sufficient to effect phase inversion. Preferably phase inversion takes place at between 0 and 80° C., more preferably at somewhat above room temperature (approx. 25–40° C.).

A second method for allowing phase inversion to take place is the addition of a second surfactant. Said second surfactant differs from the surfactant used to stabilise the O/W emulsion. If the O/W emulsion has been stabilised with Tween 80, Span 80 can be added, for example.

Furthermore, the changeover from O/W emulsion to W/O emulsion is obtained by adding a hydrophobic liquid or a salt to the O/W emulsion. The change or inversion takes place by changing the volume fractions of the water and oil phases or, respectively, changing the surface tension at the interface. In fact, the addition of a hydrophobic liquid or salt to the O/W emulsion can also be regarded as lowering the phase inversion temperature.

One advantage of the use of this method (phase inversion) is that the formation of the W/O emulsion is a spontaneous process, so that little mechanical energy is needed for emulsifying the system. This also offers advantages when the system is scaled up. Especially when the PIT method is used, separating off the particles is simple in many cases. This can be effected by means of lowering the temperature, as a result of which the W/O emulsion is destabilised. Separation can also be achieved by adding apolar solvents, preferably an apolar alcohol, more preferably cyclohexanol or cyclooctanol.

Another advantage of this system is that the particle size can be adjusted to that desired by adjusting the process conditions, such as by suitable choice of the components of the system.

Following phase inversion the starch that has been dispersed or, optionally partially, dissolved in the aqueous phase is cross-linked. The cross-linking reaction can be started before, during or after phase inversion. As a result of this reaction discrete starch particles are produced. These particles can then be separated off.

Cross-linking can be effected by means of a cross-linking agent which preferably is added to the starch/water phase. This can take place before phase inversion or during or just after phase inversion, which mainly is determined by the rate of reaction. Depending on the cross-linking agent, cross-linking can be initiated by adding a catalyst, such as a base, acid or salt.

Cross-linking preferably takes place at between 0 and 80° C., preferably between 10 and 60° C. It is obvious that cross-linking takes place at a temperature which is above the phase inversion temperature, preferably at least 10° C. and more preferentially at least 20° C. above the phase inversion temperature.

Preferably 5 to 1000 mmol, more preferably 20–500 mmol, cross-linking agent is used per mol anhydroglucose unit.

Cross-linking agents which can be used are the most common bifunctional or multifunctional reagents. Examples of cross-linking agents are the common cross-linking agents such as epichlorohydrin, glyoxal, trisodium trimetaphosphate, phosphoryl chloride or an anhydride of a dibasic or polybasic carboxylic acid. However, the use of a phosphate, such as trisodium trimetaphosphate, as cross-linking agent is particularly preferred. In these cases the catalyst can be a base such as sodium hydroxide.

A variety of other cross-linking agents are possible when modified starches are used. In the case of dialdehyde-starch the cross-linking agent can be, for example, a diamine or diamide, such as urea, tetramethylenediamine or hexamethylenediamine, in which case an acid can be used as catalyst.

Cross-linking can also be carried out using a diamine or a diol in the case of, for example, carboxymethylstarch or dicarboxystarch. However, here cross-linking can also, and advantageously, be achieved by internal ester formation, which can be catalysed by a multivalent metal ion such as calcium, magnesium, aluminium, zinc or iron, preferably calcium. Another possible starting material is cationic or aminoalkyl starch, which can be cross-linked in situ using a dicarboxylic acid or a dialdehyde.

A few other cross-linking agents are: functional epoxides such as diepoxybutane, diglycidyl ether and alkylene bis-glycidyl ethers, dichlorohydrin, dibromohydrin, adipic anhydride, glutaraldehyde, amino acids and borax.

In a number of cases it is also possible to allow a chemical modification of the starch, for example a carboxymethylation or cationisation reaction, to take place simultaneously during the cross-linking reaction.

According to a second aspect of the present invention the second phase consists of a non-solvent for starch that is readily (or completely) miscible with water over a broad concentration range. At a certain ratio between the non-solvent and water the system is no longer completely miscible and phase separation occurs, small droplets of a starch aqueous phase being present in a continuous non-solvent phase.

According to this embodiment the present invention comprises a method for the preparation of starch particles in a two-phase system, wherein the second phase is a water-miscible non-solvent for starch, which method comprises:
a) preparation of a first phase comprising a dispersion of starch in water;
b) addition of the second phase to the first phase such that phase separation occurs;
c) cross-linking of the starch present in the first phase; and
d) separating the starch particles thus formed.

Any liquid which is miscible with water and in which starch does not dissolve can be used as non-solvent for starch. Examples of such non-solvents are acetone, methanol, ethanol and isopropanol.

Ethanol is preferably used. The quantity of ethanol, during reaction, is preferably between 20 and 75%, more preferably between 45 and 55%, with respect to the quantity of the first starch-in-water phase. The condition is that a phase-separated system is obtained. The quantity is dependent on the other components, such as the starch.

Preferably, the preparation is carried out at 0–80° C., more preferably 10–60° C.

The method of cross-linking with this method corresponds to that which has been described above. Preferably 5 to 1000 mmol, more preferably 20–500 mmol, cross-linking agent is used per mol anhydroglucose unit.

With this method as well the starch does not yet have to be completely gelatinised at the start of the method. According to a preferred embodiment of the invention, partial or complete further gelatinising of the granular starch is effected during, before or after the addition of the non-solvent to the first phase. The starch can remain partially granular during cross-linking.

The particle size of these particles is between 50 nm and 100 μm. The particle size is dependent on, inter alia, starch and cross-linking agent type and concentration, reaction time and the type of non-solvent. This method as well offers the advantage that the particle size can be adjusted by adjusting the process conditions, including the various components.

Following cross-linking the particles can be separated off in a very simple manner by means of centrifuging or filtering off and drying. If necessary a little additional non-solvent is added to destabilise the system. The particles can be used immediately in applications in suspension, after partial drying. The particles can be dried in air, optionally after washing with water, ethanol or acetone, etc., or using existing drying techniques, such as roller drying, freeze drying or spray drying.

Another advantage of this method for the preparation of particles is that no surfactants are required and no acid or salt is needed to be able to separate off the particles. Consequently, re-use of the non-solvent is also possible in a simple manner.

The starch particles can be used, inter alia, in paper, textiles, explosives, foams, adhesives, hot melts, detergents, hydrogels, fertilisers, foods, artificial odours and flavourings, pharmaceutical and cosmetic products, tissues, soil improvers, pesticides, coatings, coatings removable by a mild treatment, for instance by means of enzymes or hot water, paints, inks, toners, organic reactions, catalysis, ceramics and diagnostic agents. The quantities to be used are the quantities customary for the use concerned.

EXAMPLE 1

13 g Paselli SA2 (Avebe) was dispersed in 80 g water containing 10 g NaCl. The dispersion was added to 110 g paraffin oil containing 7 g Tween 85. The O/W emulsion was brought to 22° C. 0.21 g NaOH and 1.2 ml epichlorohydrin (ECH) in 2 ml water was then added and the whole was heated to 50° C. The phase inversion temperature PIT2 (after the addition of alkali and thus during cross-linking) of the emulsion was 25° C. The reaction time was a few hours.

To initiate separation, 0.52 ml 37% HCl and 50 ml water were added. The temperature was brought to 21° C. This is the phase inversion temperature after neutralisation of the emulsion (PIT3). The phase inversion temperature before the addition of acid, PIT2, is usually somewhat higher than PIT3. It was possible to centrifuge or filter off the particles easily and rapidly. An estimate of the particle size (<600 nm) was made with the aid of light microscopy. The particles are spherical.

EXAMPLE 2

60 g Paselli SA2 (Avebe) was dispersed in 400 g water containing 45 g NaCl. The dispersion was added to 500 g paraffin oil containing 35 g Tween 85. The O/W emulsion was brought to 20° C. 0.21 g NaOH and 1.2 ml epichlorohydrin (ECH) in 2 ml water were added and the whole was heated to 50° C. The PIT2 of the W/O emulsion was 25° C. The reaction time was 16 h.

To initiate separation, 5 g 37% HCl in 200 ml water was added. The temperature was brought to 20° C. It was possible to centrifuge or filter off the particles easily and rapidly. An estimate of the particle size (<600 nm) was made with the aid of light microscopy. The particles are spherical.

EXAMPLE 3

60 g Paselli SA2 (Avebe) was dispersed in 400 g water containing 10 g NaCl. The dispersion was added to 500 g paraffin oil containing 35 g Tween 85. The O/W emulsion was brought to 20° C. The phase inversion temperature PIT1 before cross-linking of this emulsion is 25° C. 0.95 g NaOH and 3 ml water and 30 g trisodium trimetaphosphate (TSTP) were added and the whole was heated to 55° C. Phase inversion took place at 25° C. The reaction time was 3.5 h.

To initiate separation, 2.4 g 37% HCl in 200 ml water was added. The temperature was reduced to below 25° C. (i.e. PIT3). The particles were separated off by means of alternately heating and cooling about a temperature of 20° C. (phase inversion temperature after neutralisation, i.e. PIT3). An estimate of the particle size (<600 nm) was made with the aid of light microscopy.

EXAMPLE 4

200 g Paselli SA2 (Avebe) was dispersed in 1 l water containing 70 g TSTP. The dispersion was added to 1000 ml paraffin oil containing 40 g Tween 85. The O/W emulsion was brought to 20° C. Phase inversion took place at 25° C. (PIT2; PIT1 is 24° C.). 2.5 g NaOH in 10 ml water was added and the whole was heated to 50° C. The reaction time was 16 h.

To initiate separation, 6.25 g 37% HCl in 500 ml water was added. The temperature was reduced to below 22° C. (PIT3). The particles were separated off by means of alternately heating and cooling about a temperature of 22° C.

(phase inversion temperature after neutralisation, i.e. PIT3). An estimate of the particle size (<600 nm) was made with the aid of light microscopy. The particles are spherical.

EXAMPLE 5

6 g Paselli SA2 was dispersed in 40 g water containing 3 g NaCl. The dispersion was added to 55 g paraffin oil containing 3.5 g Tween 85. The O/W emulsion was brought to 20° C. 0.314 g NaOH in 2 ml water was added. 0.3 g GMAC (cationic reagent) in 2 ml water was then added with 1 ml ECH. The whole was heated to 50° C. The reaction time was 6 h.

To initiate separation, 0.79 g 37% HCl in 20 ml water was added. The temperature was reduced to below 30° C. The PIT3 was 30° C. An estimate of the particle size was made with the aid of light microscopy. It was possible to lower the PIT3 by adding NaCl.

EXAMPLE 6

12 g native potato starch (PN) was dispersed in demineralised water (600 ml) in a glass beaker with a top stirrer. Sodium hydroxide (2 g in 25 ml demineralised water) was added to the starch dispersion until a homogeneous, thick, gelatinous mass was obtained without lumps. Ethanol (EtOH, 450 ml) was then introduced slowly into the starch/water phase until a (milky, white) two-phase system was formed. After a stable situation had been obtained, 4 g TSTP was added. The reaction was carried out at room temperature for 24 h. Following reaction, ethanol (250 ml) was added until a sediment of water containing the starch particles and an EtOH-water upper layer had formed. The EtOH-water layer was poured off. Optionally it is possible to centrifuge first (3 min at 3000 rpm). If necessary the starch layer is also washed a number of times with water until virtually all EtOH has disappeared. Light microscopy showed that the starch was partially gelatinised and contained residual granules.

EXAMPLE 7

500 g native potato starch (PN) was dispersed in demineralised water (25 l) in a glass beaker with top stirrer. Sodium hydroxide (333 g) was added to the starch dispersion until a homogeneous, thick, gelatinous mass was obtained without lumps. Ethanol (EtOH, 10.4 l) was then added slowly to the starch/water phase until a (milky, white) two-phase system was formed. After a stable situation had been obtained, 366.7 g TSTP was added. The reaction was carried out at room temperature for 24 h. The EtOH-water layer was poured off as far as possible after the particles had formed a sediment. The water/starch layer was spray-dried using a Niro Mobile Minor spray dryer (position 2 at 150° C.). The particle size determined by electron microscopy was approximately 1–10 $\mu$m.

EXAMPLE 8

18 g native wax corn starch (WCN) was dispersed in demineralised water (600 ml) in a glass beaker with top stirrer. Sodium hydroxide (6 g in 25 ml demineralised water) was added to the starch dispersion until a homogeneous, thick, gelatinous mass was obtained without lumps. Ethanol (EtOH, 250 ml) was then added slowly to the starch/water phase until a (milky, white) two-phase system was formed. After a stable situation had been obtained, 4 g TSTP was added. The reaction was carried out at room temperature for 24 h. Following reaction, ethanol (156 ml) was added until a sediment of water containing the starch particles and an EtOH-water top layer had formed. An ultrasonic bath was used during the addition. The EtOH-water layer was poured off. Centrifuging (3 min at 3000 rpm) can be carried out if appropriate. If necessary, the starch layer is also washed a number of times with water until virtually all EtOH has disappeared.

EXAMPLE 9

Particles were made from Floc-gel and Paselli SA2 starch (Avebe) in a manner identical to that in Examples 6, 7 and 8. However, the quantities of EtOH added for separation (second quantity) were 230 and 255 ml, respectively.

EXAMPLE 10

100 g cationic starch (Avebe, DS=0.044) was dispersed in approximately 300 ml water. 20 g ECH and 150 mg $H_2SO_4$ were added to this dispersion. The starch suspension was then kept at 70° C. for 4 hours in order to achieve acid coupling of the ECH to the Ad starch. The starch was gelatinised at the same time. The starch solution was then cooled to room temperature.

Approximately 300 ml ethanol was then added; phase separation occurred at this water/ethanol ratio, which could be seen by the fact that the solution became turbid and could also be seen by light microscopy. As soon as phase separation occurred the pH was raised by slowly adding a solution of 1 g NaOH in 50 ml of a 1:1 water/ethanol mixture. The cross-linking reaction was started by this means. After 18 hours additional ethanol was added, after which the cross-linked starch particles were removed from the ethanol by centrifuging. The particles were washed and thickened to give a suspension containing approximately 30% solids.

What is claimed is:

1. Method for the preparation of starch particles in a two-phase system, which method comprises the following steps:
    a) preparation of a first phase comprising a dispersion of starch in water;
    b i) dispersion or emulsifying of a second (phase, which is a hydrophobic phase in the first phase, such that an oil-in-water emulsion is obtained;
    ii) inversion of the oil-in-water emulsion to a water-in-oil emulsion;
    c) cross-linking of the starch present in the first phase;
    d) separating the starch particles thus formed.

2. Method according to claim 1, wherein the starch is completely or partially gelatinised before, during or after step b) ii).

3. Method according to claim 1, wherein in step b) i) the hydrophobic phase: water ratio is 80:20 to 20:80.

4. Method according to claim 1, wherein the oil-in-water emulsion contains a surfactant.

5. Method according to claim 4, wherein the surfactant has an HLB value of 8 to 20.

6. Method according to claim 4, wherein step b) ii) comprises raising the temperature of the oil-in-water emulsion until inversion takes place.

7. Method according to claim 4, wherein step b) ii) comprises the addition of a second surfactant to the oil-in-water emulsion, such that inversion to a water-in-oil emulsion takes place.

8. Method according to claim 4, wherein step b) ii) comprises the addition of a hydrophobic liquid to the oil-in-water emulsion such that inversion to a water-in-oil emulsion takes place.

9. Method for the preparation of starch particles in a two-phase system, which method comprises:
   a) preparation of a first phase comprising a dispersion of starch in water;
   b) addition of a second phase, which is a water-miscible non-solvent for starch to the first phase such that phase separation occurs;
   c) cross-linking of the starch present in the first phase; and
   d) separating the starch particles thus formed.

10. Method according to claim 9, wherein the water-miscible non-solvent for starch is ethanol or acetone, preferably ethanol.

11. Method according to claim 9, wherein the starch is completely or partially gelatinised before, during or after step b) or c).

12. Method according to claim 1, wherein the starch consists of partially modified starch.

13. Method according to claim 1, wherein the starch content in the first phase is 1–50% (m/m).

14. Method according to claim 1, wherein cross-linking is carried out with the aid of a cross-linking agent, which is preferably trisodium trimetaphosphate or epichlorohydrin.

15. Method according to claim 1, wherein step b) i) the hydrophobic phase: water ratio is 60:40 to 40:60.

* * * * *